(12) United States Patent
Ogura et al.

(10) Patent No.: US 11,933,885 B2
(45) Date of Patent: Mar. 19, 2024

(54) RADAR SIGNAL IMAGING DEVICE, RADAR SIGNAL IMAGING METHOD, AND RADAR SIGNAL IMAGING PROGRAM

(71) Applicant: NEC Corporation, Tokyo (JP)

(72) Inventors: Kazumine Ogura, Tokyo (JP); Masayuki Ariyoshi, Tokyo (JP); Yuzo Senda, Tokyo (JP); Osamu Hoshuyama, Tokyo (JP); Taichi Tanaka, Tokyo (JP); Daisuke Ikefuji, Tokyo (JP); Shingo Yamanouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 664 days.

(21) Appl. No.: 16/972,155

(22) PCT Filed: Jun. 6, 2018

(86) PCT No.: PCT/JP2018/021713
§ 371 (c)(1),
(2) Date: Dec. 4, 2020

(87) PCT Pub. No.: WO2019/234852
PCT Pub. Date: Dec. 12, 2019

(65) Prior Publication Data
US 2021/0239829 A1  Aug. 5, 2021

(51) Int. Cl.
*G01S 13/90* (2006.01)
*G01S 7/04* (2006.01)
(Continued)

(52) U.S. Cl.
CPC ............ *G01S 13/9064* (2019.05); *G01S 7/04* (2013.01); *G01S 13/32* (2013.01); *G01S 13/867* (2013.01)

(58) Field of Classification Search
CPC ...... G01S 13/88; G01S 13/887; G01S 13/888; G01S 7/04; G01S 13/32; G01S 13/867; G01S 13/9064
See application file for complete search history.

(56) References Cited

U.S. PATENT DOCUMENTS 5,573,012 A * 11/1996 McEwan .............. A61B 5/0507
600/595
10,222,466 B2 * 3/2019 Schiessl ................ G01S 13/865
(Continued)

FOREIGN PATENT DOCUMENTS

| JP | H09-243740 A | 9/1997 |
| JP | H11-281731 A | 10/1999 |

(Continued)

OTHER PUBLICATIONS

International Search Report for PCT Application No. PCT/JP2018/021713, dated Sep. 11, 2018.
(Continued)

*Primary Examiner* — Peter M Bythrow
(74) *Attorney, Agent, or Firm* — Sughrue Mion, PLLC

(57) ABSTRACT

A radar signal imaging device 30 includes: a transmission unit 31 which transmits a radar signal toward an object to be imaged that is a non-rigid body; a position estimation unit 32 which estimates the position of the object; an oscillation degree estimation unit 33 which estimates an oscillation degree which is a degree of change within a predetermined period in the relative positions of feature points constituting the object; and a synthetic aperture processing unit 34 which performs synthetic aperture processing on the radar signal reflected by the object on the basis of the estimated position of the object and the estimated oscillation degree.

20 Claims, 15 Drawing Sheets

(51) Int. Cl.
  *G01S 13/32* (2006.01)
  *G01S 13/86* (2006.01)

(56) References Cited

U.S. PATENT DOCUMENTS

| | | | |
|---|---|---|---|
| 10,768,294 B2* | 9/2020 | Boufounos | G01S 13/72 |
| 2006/0170584 A1* | 8/2006 | Romero | A61B 5/0507 |
| | | | 342/179 |
| 2006/0233046 A1* | 10/2006 | Fluhler | G01V 1/001 |
| | | | 367/11 |
| 2011/0012777 A1* | 1/2011 | Tomich | G01S 13/9023 |
| | | | 342/25 A |
| 2015/0241563 A1* | 8/2015 | Veiga | G01S 7/486 |
| | | | 250/206.1 |
| 2016/0209506 A1* | 7/2016 | Longstaff | G01S 7/024 |
| 2018/0067204 A1* | 3/2018 | Frizzell | G01S 13/887 |
| 2019/0285740 A1* | 9/2019 | Boufounos | G01S 13/9005 |
| 2021/0088649 A1* | 3/2021 | Qi | G01S 7/41 |

FOREIGN PATENT DOCUMENTS

| | | |
|---|---|---|
| JP | 2004-157012 A | 6/2004 |
| JP | 2007-263948 A | 10/2007 |
| WO | 2017/032977 A1 | 3/2017 |

OTHER PUBLICATIONS

A. Zhuravlev et al., "ISAR for concealed objects imaging," in Proceedings of SPIE—The International Society for Optical Engineering, Mar. 13, 2015.

D. G. Lowe, "Object recognition from local scale-invariant features," Proc. of IEEE International Conference on Computer Vision (ICCV), pp. 1150-1157, Sep. 1999.

N. Dalal et al., "Histograms of oriented gradients for human detection," Proc. of IEEE Conference on Computer Vision and Pattern Recognition (CVPR), pp. 886-893, Jun. 2005, USA.

V. C. Chen et al, "Micro-Doppler effect in radar: phenomenon, model, and simulation study," IEEE Transactions on Aerospace and Electronic Systems, vol. 42, No. 1, pp. 2-21, Jan. 2006.

* cited by examiner t=0　　　　　　t=1　　　　　　t=2

( ■ : ANTENNA   📷 : ToF CAMERA )

BEFORE LAPSE
OF TIME

AFTER LAPSE
OF TIME

BEFORE LAPSE OF TIME   AFTER LAPSE OF TIME

RADAR SIGNAL IMAGING DEVICE, RADAR SIGNAL IMAGING METHOD, AND RADAR SIGNAL IMAGING PROGRAM

This application is a National Stage Entry of PCT/JP2018/021713 filed on Jun. 6, 2018, the contents of all of which are incorporated herein by reference, in their entirety.

TECHNICAL FIELD

The present invention relates to a radar signal imaging device, a radar signal imaging method, and a radar signal imaging program, and particularly to a radar signal imaging device, a radar signal imaging method, and a radar signal imaging program that can generate a clearer image by an inverse synthetic aperture technique.

BACKGROUND ART

Electromagnetic waves irradiated from an antenna are reflected by an arbitrary object. The object is imaged on the basis of the signal of the reflected wave received by the antenna. Examples of a technique for imaging an object on the basis of a signal of a reflected wave using a radar include a synthetic aperture technique.

The synthetic aperture technique using a synthetic aperture radar (Synthetic Aperture Radar: SAR) increases the aperture length without increasing the number of antennas by increasing the number of observation points using the movement of the antenna.

A technique for increasing the aperture length by using the movement of an object without moving the antenna itself is an inverse synthetic aperture technique (Inverse SAR: ISAR). The movement of an object in an ISAR is equivalent to the movement of an antenna in a SAR.

In the following, attention will be paid to a radar signal imaging system using the inverse synthetic aperture technique. Non Patent Literature (NPL) 1 describes a system using the inverse synthetic aperture technique. FIG. 19 is an explanatory diagram showing an example of a system using the inverse synthetic aperture technique.

As shown in FIG. 19, in the system described in NPL 1, antennas are arranged perpendicularly to the ground. A Time of Flight (ToF) camera is placed on a panel lined with antennas.

The system described in NPL 1 attempts to acquire a clear image only by using an inexpensive device by executing radar signal imaging by ISAR using the movement of a pedestrian.

When acquiring an image, the system described in NPL 1 uses a ToF camera to track an object. In other words, the system described in NPL 1 estimates the position of the object obtained by the inverse synthetic aperture technique using the ToF camera.

In order to use the inverse synthetic aperture technique, the following two conditions must be satisfied. The first condition is that the position of the object which is the reflection source of the signal is known. The second condition is that the object is rigid.

FIG. 20 is an explanatory diagram showing an example of a change of a rigid body with the lapse of time. If an object is considered to be an object constituted of a plurality of reflection points, the relative positions of the reflection points constituting the rigid body do not change over time, as shown in FIG. 20.

FIG. 21 is an explanatory diagram showing an example of a change of a person with the lapse of time. As shown in FIG. 21, a person moves a hand or a foot, for example, when walking. In other words, when the object is a person, the relative positions of the reflection points constituting the person change with a lapse of time.

Further, PTL 1 describes an image radar device which specifies, for example, a target shape, a reflection intensity distribution, and a type by observing a distant target on the basis of a reception radio wave composed of a transmission radio wave and a reflection radio wave.

NPL 2 describes Scale-Invariant Feature Transform (SIFT) which is a method for detecting a reflection point. NPL 3 describes Histograms of Oriented Gradients (HOG) which is a method for detecting a reflection point.

NPL 4 describes a method for estimating the oscillation degree of an object to be described below on the basis of a radar signal.

CITATION LIST

Patent Literature

PTL 1: Japanese Laid-Open Patent Publication No. 2007-263948

Non Patent Literature

NPL 1: A. Zhuravlev, V. Razevig, I. Vasiliev, S. Ivashov, and V. Voronin, "ISAR for concealed objects imaging," in Proceedings of SPIE, March, 2015.
NPL 2: D. G. Lowe, "Object recognition from local scale invariant features," Proc. of IEEE International Conference on Computer Vision (ICCV), pp. 1150-1157, 1999.
NPL 3: N. Dalal, and B. Triggs, "Histograms of oriented gradients for human detection," Proc. of IEEE Conference on Computer Vision and Pattern Recognition (CVPR), pp. 886-893, 2005.
NPL 4: V. C. Chen, "Micro-Doppler effect in radar: phenomenon, model, and simulation study," IEEE Transactions on Aerospace and Electronic Systems, pp. 2-21, 2006.

SUMMARY OF INVENTION

Technical Problem

The system described in NPL 1 assumes that only an object is translated during the target period of the synthetic aperture processing, and that the relative positions of the reflection points constituting the object are not changed (i.e., the object is rigid).

Therefore, if the relative positions of the reflection points constituting the object are changed during the target period of the synthetic aperture processing, the image generated by the synthetic aperture processing by the system described in NPL 1 degrades.

The reason for the degradation is that since the system described in NPL 1 does not observe a change in the relative positions of the reflection points constituting the object, the synthetic aperture processing is executed over the entire target period of the synthetic aperture processing including a period in which the change in the relative positions of the reflection points is large.

The image radar device described in PTL 1 also assumes that the object is a rigid. Therefore, there is a need for a technique capable of clearly imaging an object with ISAR even if the object is a non-rigid object in which the relative positions of a reflection points constituting the object change.

[Purpose of Invention]

Accordingly, it is an object of the present invention to provide a radar signal imaging device, a radar signal imaging method, and a radar signal imaging program that can clearly image a non-rigid object by the inverse synthetic aperture technique, which solve the above problems.

Solution to Problem

A radar signal imaging device according to the present invention includes: a transmission unit which transmits a radar signal toward an object to be imaged that is a non-rigid body; a position estimation unit which estimates the position of the object; an oscillation degree estimation unit which estimates an oscillation degree which is a degree of change within a predetermined period in the relative positions of feature points constituting the object; and a synthetic aperture processing unit which performs synthetic aperture processing on the radar signal reflected by the object on the basis of the estimated position of the object and the estimated oscillation degree.

A radar signal imaging method according to the present invention includes: transmitting a radar signal toward an object to be imaged that is a non-rigid body; estimating the position of the object; estimating an oscillation degree which is a degree of change within a predetermined period in the relative positions of feature points constituting the object; and performing synthetic aperture processing on the radar signal reflected by the object on the basis of the estimated position of the object and the estimated oscillation degree.

A radar signal imaging program according to the present invention causes a computer to execute: a transmission process of transmitting a radar signal toward an object to be imaged that is a non-rigid body; a position estimation process of estimating the position of the object; an oscillation degree estimation process of estimating an oscillation degree which is a degree of change within a predetermined period in the relative positions of feature points constituting the object; and a synthetic aperture process on the radar signal reflected by the object on the basis of the estimated position of the object and the estimated oscillation degree.

Advantageous Effects of Invention

The present invention can clearly image a non-rigid object by the inverse synthetic aperture technique.

DESCRIPTION OF EMBODIMENTS

Figure 1:
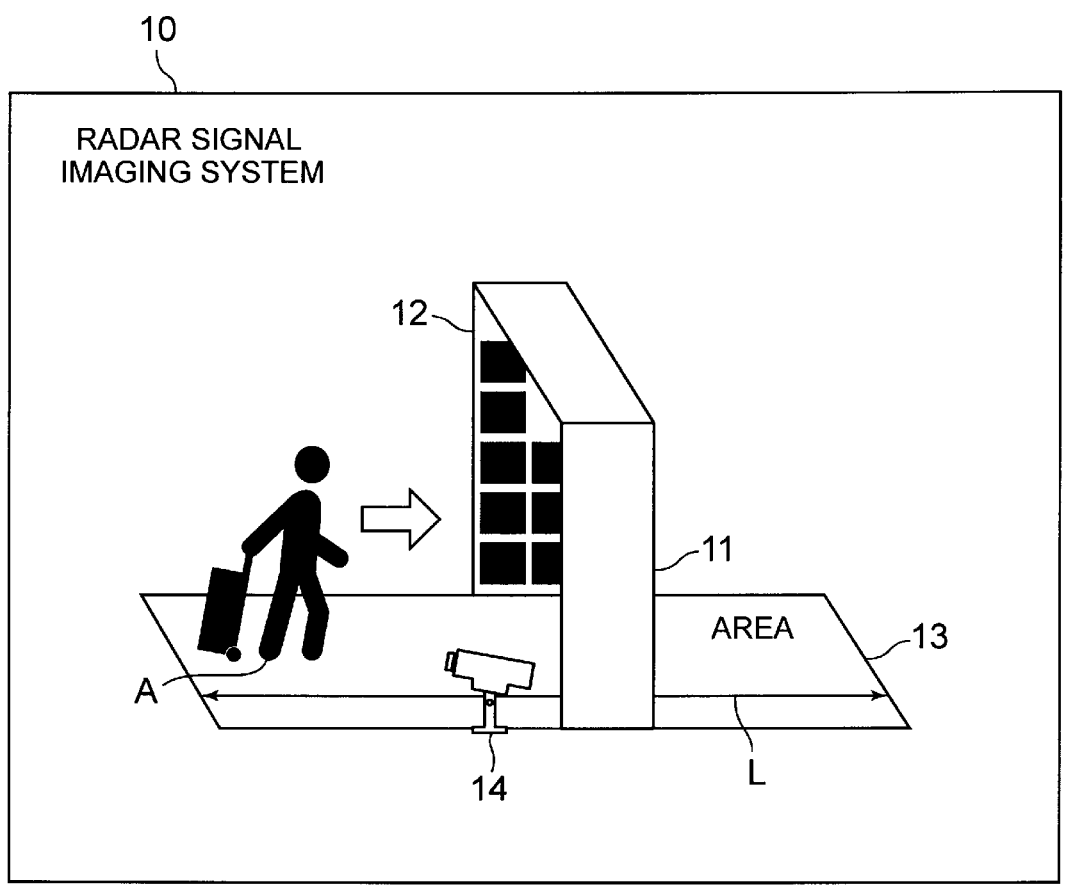
FIG. 1 is an explanatory diagram showing an example of a radar signal imaging system according to the present invention.

Exemplary embodiments of the present invention will now be described with reference to the drawings. FIG. 1 is an explanatory diagram showing an example of a radar signal imaging system according to the present invention. The radar signal imaging system 10 shown in FIG. 1 is intended to suppress image degradation, which is a problem described above.

In the radar signal imaging system 10 shown in FIG. 1, electromagnetic waves irradiated from an antenna is reflected by an object A. The antenna receives the reflected signal. The object A is imaged on the basis of the received reflected signal.

In the example shown in FIG. 1, the object A walks on an area 13 having the total length L and passes between side panels 11 and 12. The side panels 11 and 12 are provided with a plurality of antennas so that the object A walking on the area 13 is irradiated with electromagnetic waves.

The plurality of antennas installed on the side panels is constituted of a transmission antenna and a reception antenna. Further, the plurality of antennas installed on the side panels may be constituted of antennas capable of transmitting and receiving.

Note that the number of antennas, the positions of the antennas, and the orientations of the antennas installed on the side panels are not particularly limited. The side panel on which the antennas are installed may be one of the side panel 11 and the side panel 12.

The installation angle of the side panels is not particularly limited. A case where an antenna is installed on the side panel 12 will be described below.

An external sensor 14 shown in FIG. 1 senses the object A from the side of the object. The role of the external sensor 14 is to measure the oscillation degree of the object A and to estimate the position of the object A. Note that the number of external sensors 14 installed and the installation position of the external sensors 14 are not particularly limited.

As the external sensor 14, for example, an optical sensor, a stereo camera, and a ToF camera are used. A case where the external sensor 14 is a camera will be described below.

An exemplary embodiment in which the position of the object A is estimated on the basis of a radar signal will be described in a second exemplary embodiment. An exemplary embodiment in which the position and the oscillation degree of the object A are estimated on the basis of the radar signal without using the external sensor 14 will be described in a third exemplary embodiment. Note that the spatial coordinates of each exemplary embodiment are assumed to be coordinates in the three-dimensional Euclidean space.

First Exemplary Embodiment

A first exemplary embodiment of a radar signal imaging system according to the present invention will be first described. In the present exemplary embodiment, the position of the object A determined by the inverse synthetic aperture technique is estimated on the basis of the sensor data acquired by the external sensor 14. The oscillation degree of the object A is also estimated on the basis of the sensor data acquired by the external sensor 14.

[Description of Configuration]

Figure 2:
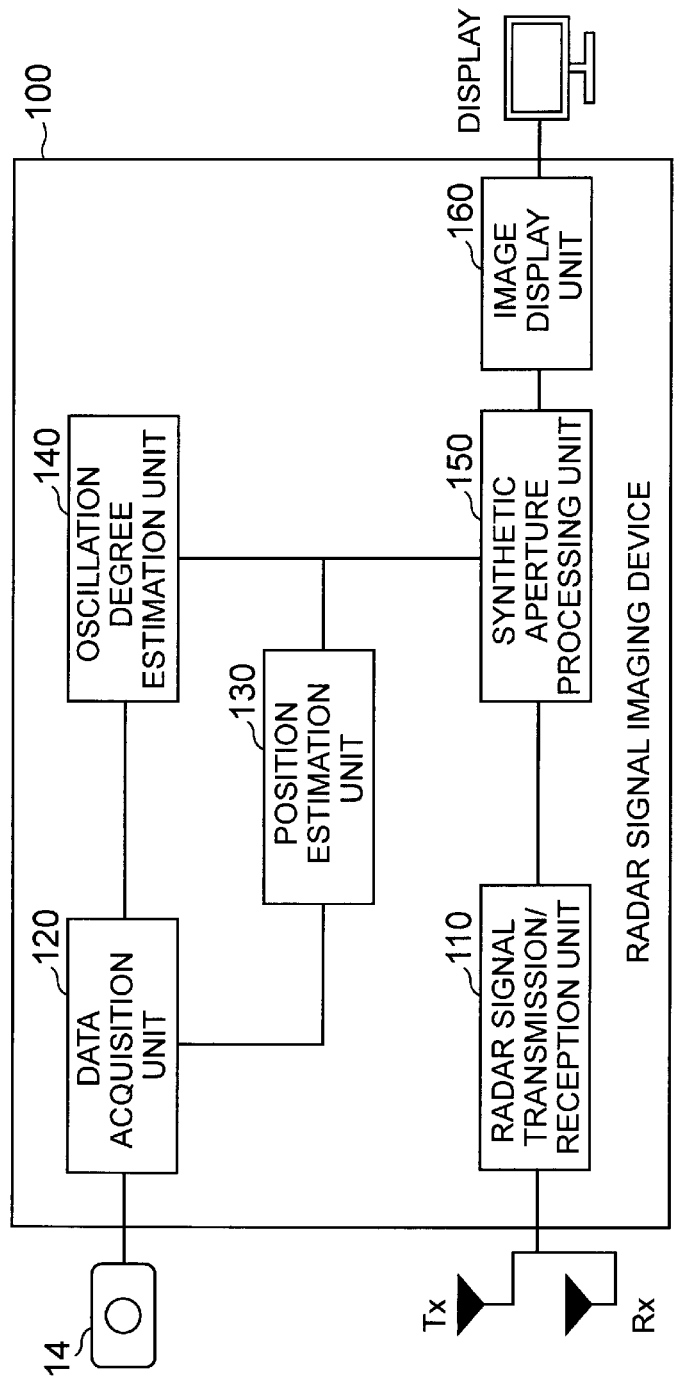
FIG. 2 is a block diagram showing a configuration example of a radar signal imaging device according to a first exemplary embodiment of the present invention.

FIG. 2 is a block diagram showing a configuration example of a radar signal imaging device according to the first exemplary embodiment of the present invention. A radar signal imaging device 100 shown in FIG. 2 is a device used in the radar signal imaging system 10 shown in FIG. 1.

Specifically, the radar signal imaging device 100 is a device for imaging the object A on the basis of measurement data obtained from the antenna and the external sensor 14 shown in FIG. 1.

The radar signal imaging device 100 shown in FIG. 2 includes a radar signal transmission/reception unit 110, a data acquisition unit 120, a position estimation unit 130, an oscillation degree estimation unit 140, a synthetic aperture processing unit 150, and an image display unit 160. Note that the time referred to by each component of the radar signal imaging device 100 is synchronized.

The radar signal transmission/reception unit 110 has a function of transmitting electromagnetic waves via a transmission antenna (Tx) and receiving reflected waves via a reception antenna (Rx). Tx and Rx shown in FIG. 2 correspond to the antennas shown in FIG. 1. Hereinafter, Tx and Rx shown in FIG. 2 are collectively referred to as a radar module.

The radar signal transmission/reception unit 110 transmits electromagnetic waves via Tx and receives a reflected signal via Rx. The radar signal transmission/reception unit 110 inputs the radar signal extracted from the received signal and the current time to the synthetic aperture processing unit 150.

The electromagnetic waves transmitted from Tx are, for example, a pulse, a continuous wave (Continuous Wave (CW)), or a frequency modulation continuous wave (Frequency Modulation CW (FMCW) or Stepped Frequency CW). In the following, a case where an FMCW is transmitted from Tx will be considered.

When the FMCW is used, the distance from a radar to a reflector is obtained. Obtaining the distance from the radar to the reflector allows a clearer image of the reflector to be generated.

Figure 3:
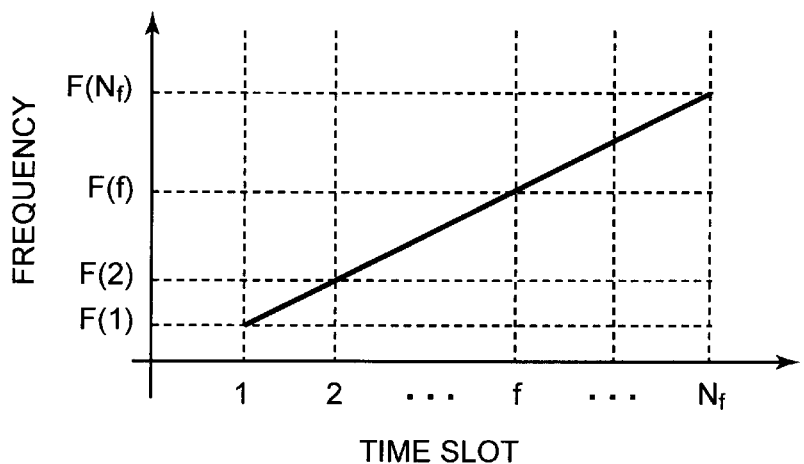
FIG. 3 is an explanatory diagram showing an example of the frequency change of the FMCW with the lapse of time.

FIG. 3 is an explanatory diagram showing an example of the frequency change of the FMCW with the lapse of time. As shown in FIG. 3, the frequency in the time slot f is F(f). The time slot shown in FIG. 3 is the minimum unit of sample time in the radar module (Tx and Rx).

As shown in FIG. 3, the frequency increases linearly over time slots 1 to $N_f$. The time slots 1 to $N_f$ are a time sufficiently smaller than the time when the object A is moving. In other words, the object A is considered not to be moving during the period from the time slots 1 to $N_f$.

The radar signal transmission/reception unit 110 mixes a reflected signal received via Rx with a transmission signal transmitted from Tx and then down-converts the mixed signal. The radar signal transmission/reception unit 110 handles an intermediate frequency (IF) signal generated by the down-conversion as a radar signal.

Hereinafter, an IF signal relating to the time t, the frequency at the time slot f, the transmission antenna x, and the reception antenna y is referred to as S(t, f, x, y). The radar signal transmission/reception unit 110 inputs the generated IF signal to the synthetic aperture processing unit 150.

The data acquisition unit 120 has a function of acquiring sensor data from the external sensor 14. The data acquisition unit 120 acquires sensor data from the external sensor 14, and inputs the sensor data attached with the current time to the position estimation unit 130 and the oscillation degree estimation unit 140. In the present exemplary embodiment, the sensor data acquired by the data acquisition unit 120 is image data since the external sensor 14 is a camera.

The position estimation unit 130 has a function of estimating the position of the object A on the basis of the sensor data obtained by the external sensor 14. The position estimation unit 130 estimates the position of the object A on the basis of the sensor data with time inputted from the data acquisition unit 120.

The position estimation unit 130 then inputs the position information with time indicating the estimated position to the synthetic aperture processing unit 150. The time attached to the inputted position information is the same as the current time inputted from the data acquisition unit 120. Alternatively, the information associated with the current time inputted from the data acquisition unit 120 may be attached to the position information instead of the time.

When a stereo camera or a plurality of cameras is used as the external sensor 14, the position estimation unit 130 can compute the position of the object A by triangulation.

The ToF camera can compute the distance to the object A. Therefore, when a plurality of ToF cameras is used as the external sensor 14, the position estimation unit 130 can compute the position of the object A by trilateration.

When estimating the position of an object, the position estimation unit 130 may compute the position of at least one arbitrary point for each object. One point at which the position is computed is, for example, the center of gravity of an object or a characteristic point (marking point) of an object.

Specifically, the marking point is a point where the position at which an object has moved can be computed from the change of the position with the lapse of time.

Hereinafter, the position information of the object A at the computed time t is referred to as TP(t).

Note that in the present exemplary embodiment, the number of external sensors 14, the type of external sensors 14, and the method for estimating the position of the object A are not particularly limited.

The oscillation degree estimation unit 140 has a function of estimating the oscillation degree of the object A on the basis of the sensor data obtained by the external sensor 14. The oscillation degree estimation unit 140 estimates the oscillation degree of the object A on the basis of the sensor data with time inputted from the data acquisition unit 120.

The oscillation degree estimation unit 140 then inputs the oscillation degree with time indicating the estimated oscillation degree to the synthetic aperture processing unit 150. The time attached to the oscillation degree inputted is the same as the current time inputted from the data acquisition unit 120. Alternatively, the information associated with the current time inputted from the data acquisition unit 120 may be attached to the oscillation degree instead of the time.

The oscillation degree of an object in the present exemplary embodiment is a value representing the degree by which the relative positions of reflection points (feature points) constituting the object have changed with the lapse of time.

Two methods for estimating the oscillation degree by image-processing will be described below. The first method is a method in which the feature points of the object are extracted and the coordinates of the extracted feature points are utilized.

Note that examples of a method for detecting a feature point of an object include SIFT described in NPL 2 and HOG described in NPL 3.

Figure 4:
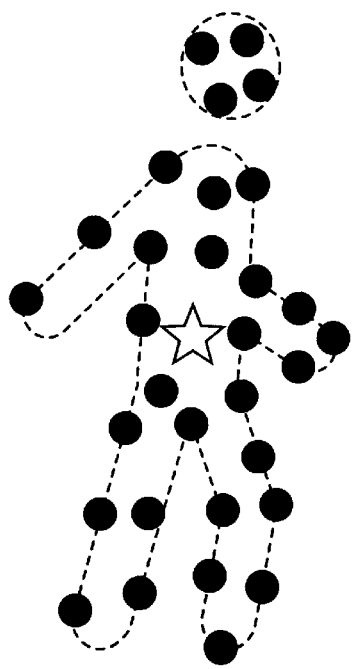
FIG. 4 is an explanatory diagram showing an example of a feature point and a reference point of an object.

FIG. 4 is an explanatory diagram showing an example of a feature point and a reference point of an object. The reference point is a point serving as a reference for the relative position of the feature point. The reference point may be anywhere within the object. For example, the position of the center of gravity of the object at time 1 (at the beginning of a synthetic aperture processing) is used as the reference point.

As shown in FIG. 4, when the object is considered to be a set of feature points, the oscillation degree is considered to be the degree of change in the relative positions of the feature points constituting the object during a predetermined period.

For example, when a pedestrian is observed from the side of the pedestrian, the trunk of the pedestrian moves substantially parallel to the traveling direction. However, the hands and feet of pedestrians move in a complex fashion. In other words, the relative positions of the feature points such as the hands and feet with respect to the feature points of the trunk greatly change during walking. When a pedestrian twists his or her body during walking, the relative positions of the feature points of the trunk also change greatly during walking.

The relationship between the position $(x_i(t), y_i(t), z_i(t))$ of the i-th feature point of the object at time t and the relative position vector $rp_i(t)$ from the reference point st is represented by the following Expression (1).

[Expression 1]

$$rp_i(t)=(x_i(t),y_i(t),z_i(t))-st \qquad \text{Expression (1)}$$

The matrix RP(t) in which the relative position vectors of the respective feature points of the object are arranged side by side is represented by the following expression (2).

[Expression 2]

$$RP(t)=\{rp_1(t),rp_2(t),\ldots,rp_N(t)\} \qquad \text{Expression (2)}$$

The oscillation degree VP(t) of the object at time t is computed by the following Expression (3).

[Expression 3]

$$VP(t)=\text{norm}(RP(t)-RP(t-1)) \qquad \text{Expression (3)}$$

Note that the norm in the Expression (3) is a function for computing the Frobenius norm of the input matrix.

Figure 5:
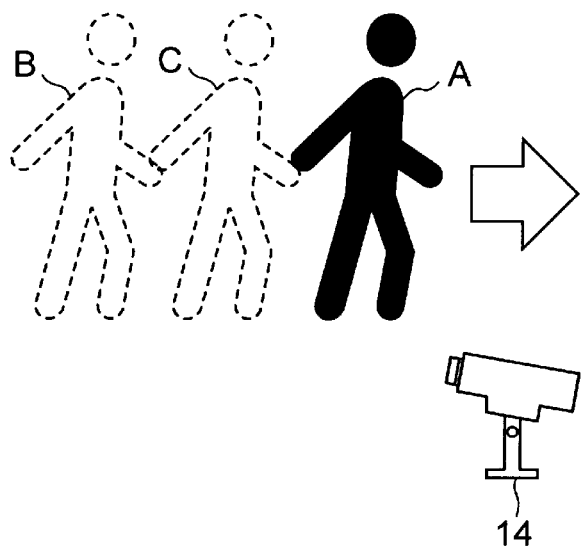
FIG. 5 is an explanatory diagram showing an example of the movement of an object.

The second method for estimating the oscillation degree is based on the number of pixels the object occupies in the image photographed by the camera. FIG. 5 is an explanatory diagram showing an example of the movement of an object.

The object A shown in FIG. 5 is moved in the direction of an arrow. The external sensor 14 senses the object A from the side of the object. The external sensor 14 is arranged to estimate the oscillation degree of the object A.

The position of the object A shown in FIG. 5 is the position of the object A at time t=2. In addition, the position of the afterimage B shown in FIG. 5 is the position of the object A at time t=0. Further, the position of the afterimage C shown in FIG. 5 is the position of the object A at time t=1.

Figure 6:
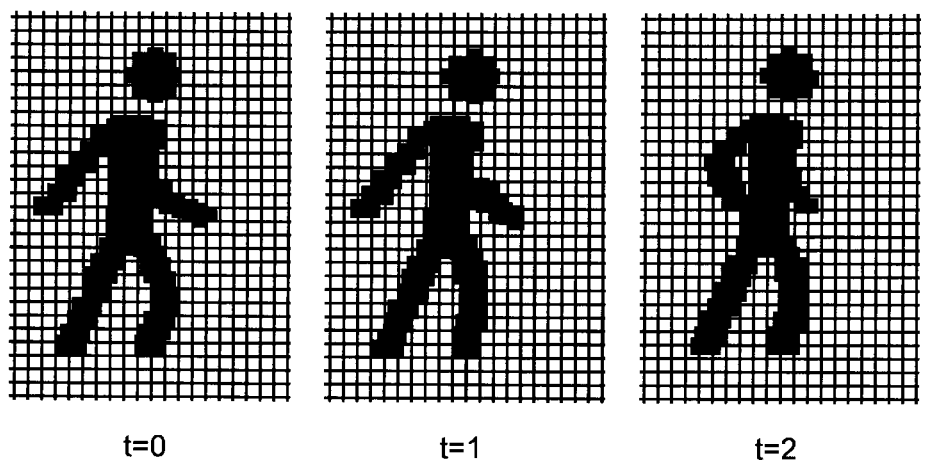
FIG. 6 is an explanatory diagram showing an example of a pixel image of an object photographed by an external sensor 14.

FIG. 6 is an explanatory diagram showing an example of a pixel image of an object photographed by the external sensor 14. FIG. 6 shows pixel images when the external sensor 14 photographs the object A at t=0, t=1, and t=2, respectively.

The oscillation degree estimation unit 140 can compute the oscillation degree VP(t) of the object A at the time t on the basis of the number of pixels forming the object A. For example, if the number of pixels occupied by the object A is 100 at t=0, 105 at 1=1, and 90 at t=2, the oscillation degree estimation unit 140 can compute the oscillation degree VP(1) between t=0 and t=1 as 5, and the oscillation degree VP(2) between t=1 and t=2 as 15.

However, the scale of the object A changes according to the distance between the external sensor 14 and the object A. When the scale of the object A changes during sensing, measures needs to be taken, for example, to normalize the scale of the object A in the image, or to install a plurality of external sensors so that the distance between the object A and the external sensor 14 is always constant.

Note that the two oscillation degrees VP(t) are difference values of the number of pixels when the previous time slot is used as a reference. However, the reference time slot may not necessarily be the previous time slot. For example, the time slot when the synthetic aperture processing is started may be used as a reference.

Although the present exemplary embodiment has described an example of computing the oscillation degree using a two-dimensional image, the oscillation degree estimation unit 140 may compute the oscillation degree on the basis of a three-dimensional shape including depth information observed by a ToF camera or a stereo camera. The number of external sensors 14 and the positions where the external sensors 14 are installed are not particularly limited.

The synthetic aperture processing unit 150 has a function of performing a synthetic aperture processing on the basis of the estimated position of the object A and the estimated oscillation degree of the object A.

The synthetic aperture processing unit 150 of the present exemplary embodiment has the following three functions. As the first function, the synthetic aperture processing unit 150 accumulates the radar signal with time inputted from the radar signal transmission/reception unit 110, the position information with time of the object A inputted from the position estimation unit 130, and the oscillation degree with time of the object A inputted from the oscillation degree estimation unit 140.

The synthetic aperture processing unit 150 also selects an IF signal to be used for the synthetic aperture processing on the basis of the radar signal with time inputted from the radar signal transmission/reception unit 110, the position information with time of the object A inputted from the position estimation unit 130, and the oscillation degree with time of the object A inputted from the oscillation degree estimation unit 140. As the second function, the synthetic aperture processing unit 150 executes the synthetic aperture processing on the selected IF signal to compute image information.

As the third function, the synthetic aperture processing unit 150 inputs the computed image information to the image display unit 160.

The second function will be described in detail below. Note that a description will be given of the synthetic aperture processing when the allowable value H of the oscillation degree is set in advance. The user previously determines the maximum synthetic aperture length D and the maximum synthetic aperture period T. Note that the user may determine only one of the maximum synthetic aperture length D and the maximum synthetic aperture period T.

The synthetic aperture processing of the present exemplary embodiment is started when any one of the synthetic aperture length, the synthetic aperture period, and the object oscillation degree satisfies a specific condition. Conditions for starting the synthetic aperture processing and a method for selecting a radar signal used for the synthetic aperture processing will be described below.

1. When the synthetic aperture length becomes larger than the maximum synthetic aperture length D, the synthetic aperture processing unit 150 performs a synthetic aperture processing on the radar signal inputted from the radar signal transmission/reception unit 110 before the synthetic aperture length becomes larger than the maximum synthetic aperture length D.

The synthetic aperture length of the present exemplary embodiment is equal to the distance which is the difference between the position of the object A at the time when the synthetic aperture processing is started and the position of the object A inputted from the position estimation unit 130. In other words, the distance which is the difference is the moving distance of the object A from the time when the synthetic aperture processing is started to the current time. The distance which is the difference is computed by the following Expression (4).

[Expression 4]

$$g(t)=TP(t)-TP(1) \quad \text{Expression (4)}$$

2. When the synthetic aperture period becomes longer than the maximum synthetic aperture period T, the synthetic aperture processing unit 150 performs a synthetic aperture processing on the radar signal inputted from the radar signal transmission/reception unit 110 before the synthetic aperture period becomes longer than the maximum synthetic aperture period T.

The synthetic aperture period of the present exemplary embodiment is equal to the time which is the difference between the time inputted from the radar signal transmission/reception unit 110 for the first time after the synthetic aperture processing unit 150 starts the synthetic aperture processing and the time inputted from the radar signal transmission/reception unit 110, the position estimation unit 130, or the oscillation degree estimation unit 140. In other words, the time which is the difference is the elapsed time from the time when the synthetic aperture processing is started to the current time.

Figure 7:
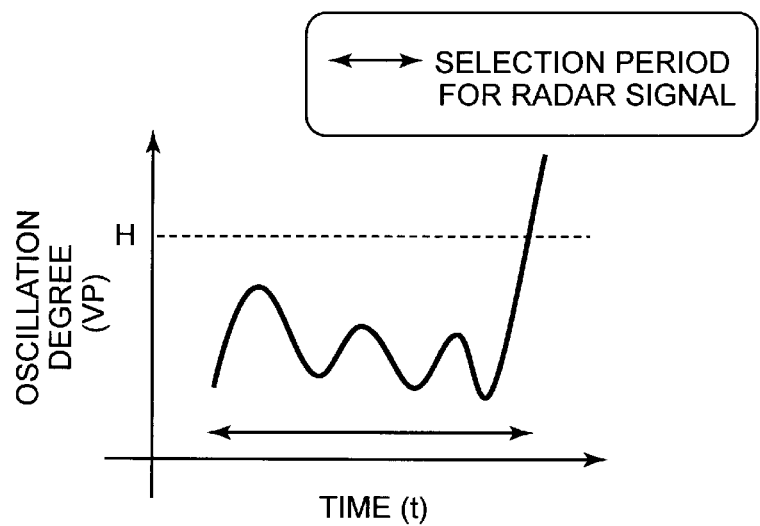
FIG. 7 is an explanatory diagram showing an example of the time variation of the oscillation degree of an object.

3. The synthetic aperture processing unit 150 may select data to be used for the synthetic aperture processing on the basis of the oscillation degree. FIG. 7 is an explanatory diagram showing an example of the time variation of the oscillation degree of an object.

As shown in FIG. 7, the synthetic aperture processing unit 150 performs a synthetic aperture processing on the radar signal in a period in which the oscillation degree VP(t) of the object is smaller than the allowable value H among the radar signals inputted from the radar signal transmission/reception unit 110.

Figure 8:
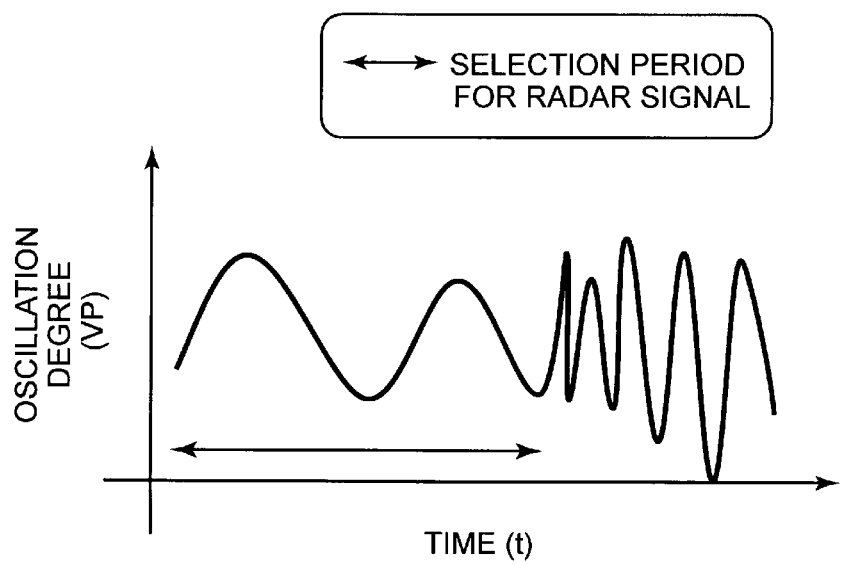
FIG. 8 is an explanatory diagram showing another example of the time variation of the oscillation degree of an object.

FIG. 8 is an explanatory diagram showing another example of the time variation of the oscillation degree of an object. As another method for selecting the radar signal on the basis of the oscillation degree VP(t) of the object, the synthetic aperture processing unit 150 may select the radar signal in a period in which the fluctuation of the oscillation degree is small and stable, as shown in FIG. 8.

Figure 9:
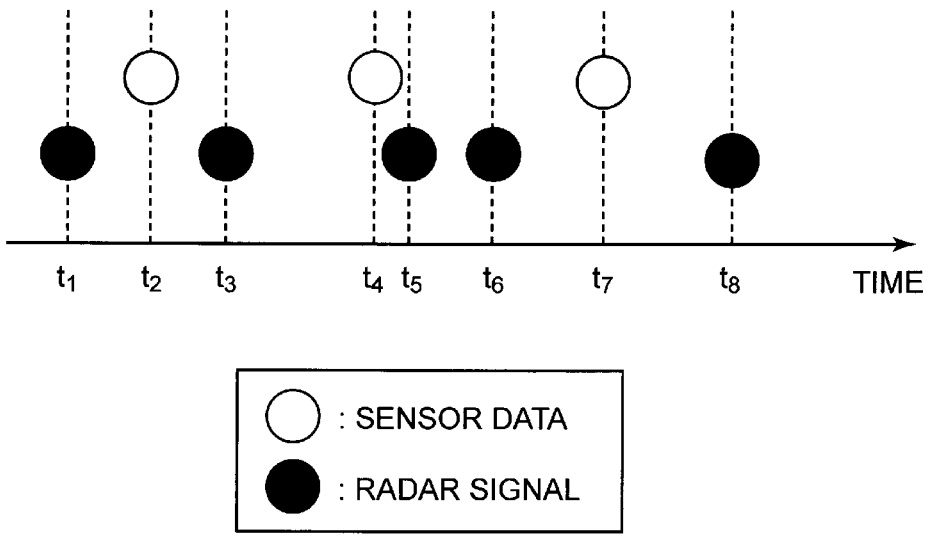
FIG. 9 is an explanatory diagram showing an example of sensor data and radar signals arranged in time series.

Note that the time given to the radar signal by the radar signal transmission/reception unit 110 and the time given to the sensor data by the data acquisition unit 120 are not necessarily the same time. FIG. 9 is an explanatory diagram showing an example of sensor data and radar signals arranged in time series.

FIG. 9 shows the time given to the radar signal and the time given to the sensor data. For example, when any one of the synthetic aperture length, the synthetic aperture period, and the object oscillation degree satisfies a specific condition at time $t_7$, the synthetic aperture processing unit 150 performs a synthetic aperture processing by selecting only each radar signal at time $t_1$, time $t_3$, time $t_5$, and time $t_6$. Alternatively, the synthetic aperture processing unit 150 performs a synthetic aperture processing by selecting only each radar signal at time $t_1$ and time $t_3$.

When any one of the synthetic aperture length, the synthetic aperture period, and the object oscillation degree satisfies a specific condition at time $t_4$, the synthetic aperture processing unit 150 performs a synthetic aperture processing by selecting only each radar signal at time $t_1$ and time $t_3$. Alternatively, the synthetic aperture processing unit 150 performs a synthetic aperture processing by selecting only the radar signal at time $t_1$.

Further, the synthetic aperture processing unit 150 may select a radar signal to be used on the basis of the oscillation degree from the radar signals of the period up to the point in time when any one of the synthetic aperture length and the synthetic aperture period satisfies a specific condition.

Figure 10:
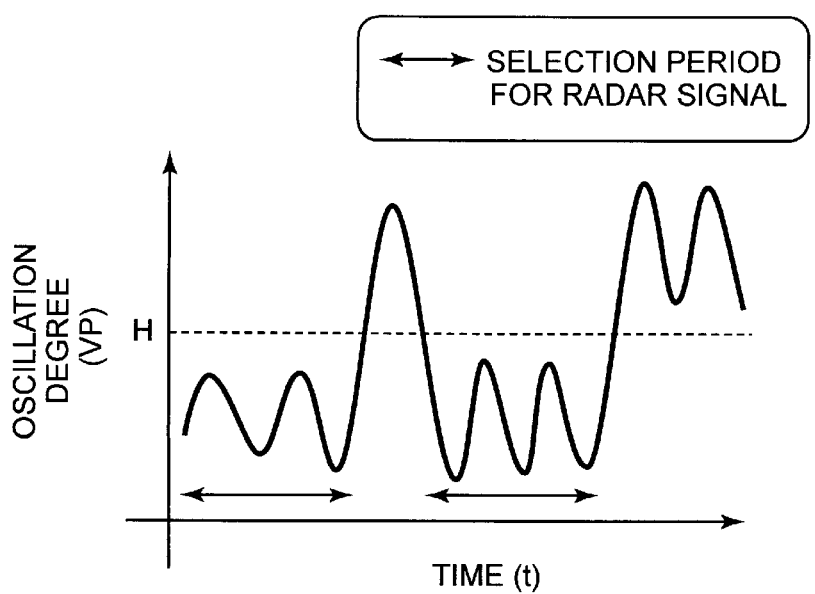
FIG. 10 is an explanatory diagram showing another example of the time variation of the oscillation degree of an object.

FIG. 10 is an explanatory diagram showing another example of the time variation of the oscillation degree of an object. As shown in FIG. 10, the synthetic aperture processing unit 150 may select a radar signal obtained by removing a radar signal of a specific period from a radar signal of a predetermined period as a radar signal to be used.

Note that the synthetic aperture processing unit 150 selects a radar signal in a period in which the oscillation degree is smaller than the predetermined value in the example shown in FIG. 10, as in the example shown in FIG. 8, the synthetic aperture processing unit 150 may select a radar signal in a period in which the fluctuation amount of the oscillation degree is small.

The timing and conditions for starting the synthetic aperture processing and the radar signal used in the synthetic aperture processing have been described above.

An example in which the radar signal used in the synthetic aperture processing is a signal observed between t=0 and t=$N_t$ will be described below. In this example, the radar module is constituted of $N_x$ transmission antennas and $N_y$ reception antennas.

Figure 11:
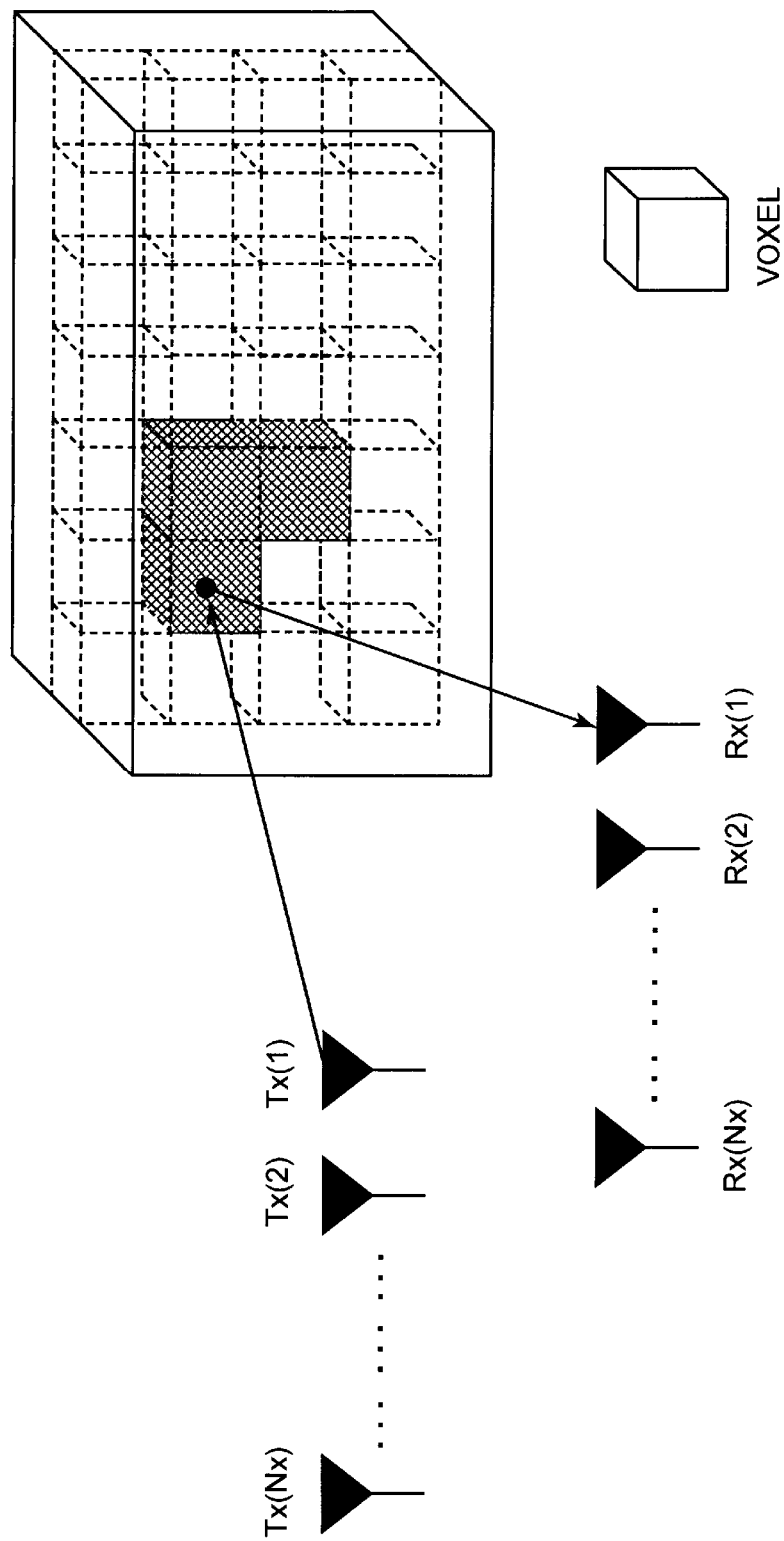
FIG. 11 is an explanatory diagram showing an example of image information of an object represented by voxels.

FIG. 11 is an explanatory diagram showing an example of image information of an object represented by voxels. The rectangular parallelepiped with the lattice shown in FIG. 11 shows the image information A(v) of the object A computed by the synthetic aperture processing unit 150.

The coordinate system of the three-dimensional space shown in FIG. 11 is an orthogonal coordinate system. In the orthogonal coordinate system, the three-dimensional space is considered to be a set of rectangular parallelepipeds (voxels: v) shown in FIG. 11. The size of the voxel can be freely changed. The user determines the size of the voxel according to the computation amount and the size of the object to be imaged.

The position of each antenna or object in the orthogonal coordinate system is represented as a position coordinate, respectively. In other words, each antenna or object is located in one of the voxels.

The synthetic aperture processing unit 150 computes the image information A(v) of the object A located in the voxel v using, for example, Digital Beam Forming (DBF) which is commonly used as an imaging method, as represented by the following Expression (5).

[Expression 5]

$$A(v) = \sum_{t=1}^{N_t} \sum_{f=1}^{N_f} \sum_{y=1}^{N_y} \sum_{x=1}^{N_x} \left( S(t, f, x, y) \cdot e^{\frac{2\pi j \cdot F(f)}{c} R_v(t, x, y)} \right)$$

Expression (5)

In other words, A(v) represents the amplitude in voxel v. Note that S(t, f, x, y) in the Expression (5) represents a radar signal inputted from the radar signal transmission/reception unit 110. Further, c is the speed of light. $N_f$ and F(f) are the time slot and frequency shown in FIG. 3. $N_t$ is the number of time samples of the selected radar signal.

In the example shown in FIG. 9, when any one of the synthetic aperture length, the synthetic aperture period, and the object oscillation degree satisfies a specific condition at time $t_7$, the radar signals at time $t_1$, time $t_3$, time $t_5$, and time $t_6$ are selected, so that $N_t$=4. The first Σ in the Expression (5) represents the total sum of the selected radar signals.

In the example shown in FIG. 10, the synthetic aperture processing unit 150 does not continuously select radar signals arranged in time series. The excluded radar signal is not used in the synthetic aperture processing.

Further, Rv(t, x, y) in the Expression (5) is a value obtained by adding the distance from the transmission antenna x to the object and the distance from the object to the reception antenna y. Rv(t, x, y) is computed as represented by the following Expression (6).

[Expression 6]

$$R_v(t,x,y)=|Tx(x)-(v+g(t))|+|Rx(y)-(v+g(t))|$$

Expression (6)

In the Expression (6), Tx(x) and Rx(y) represent the positions of the transmission antenna and the reception antenna, respectively. Further, g(t) is a vector representing the translation of the object A from the start time (t=1) of the synthetic aperture processing to the time t. In other words, g(t) is computed as shown in the Expression (4) on the basis of the position information TP(t) inputted from the position estimation unit 130 and the position information TP(1) of the object A at the time of starting the synthetic aperture processing.

Note that the synthetic aperture processing unit 150 may use a method such as w-k instead of DBF as an imaging method.

The image display unit 160 has a function of displaying the image of the object A on the display on the basis of the data generated by the synthetic aperture processing. The image display unit 160 receives the image information A(v) from the synthetic aperture processing unit 150 and displays the information on the display.

The image display unit 160 processes the received image information A(v) into a video image of a specified format and displays the image on the display. For example, the image display unit 160 may display the image information A(v) as a three-dimensional image on the display as it is. Further, the image display unit 160 may extract a two-dimensional image corresponding to any direction from the three-dimensional images and display the image on the display.

[Description of Operation]

Figure 12:
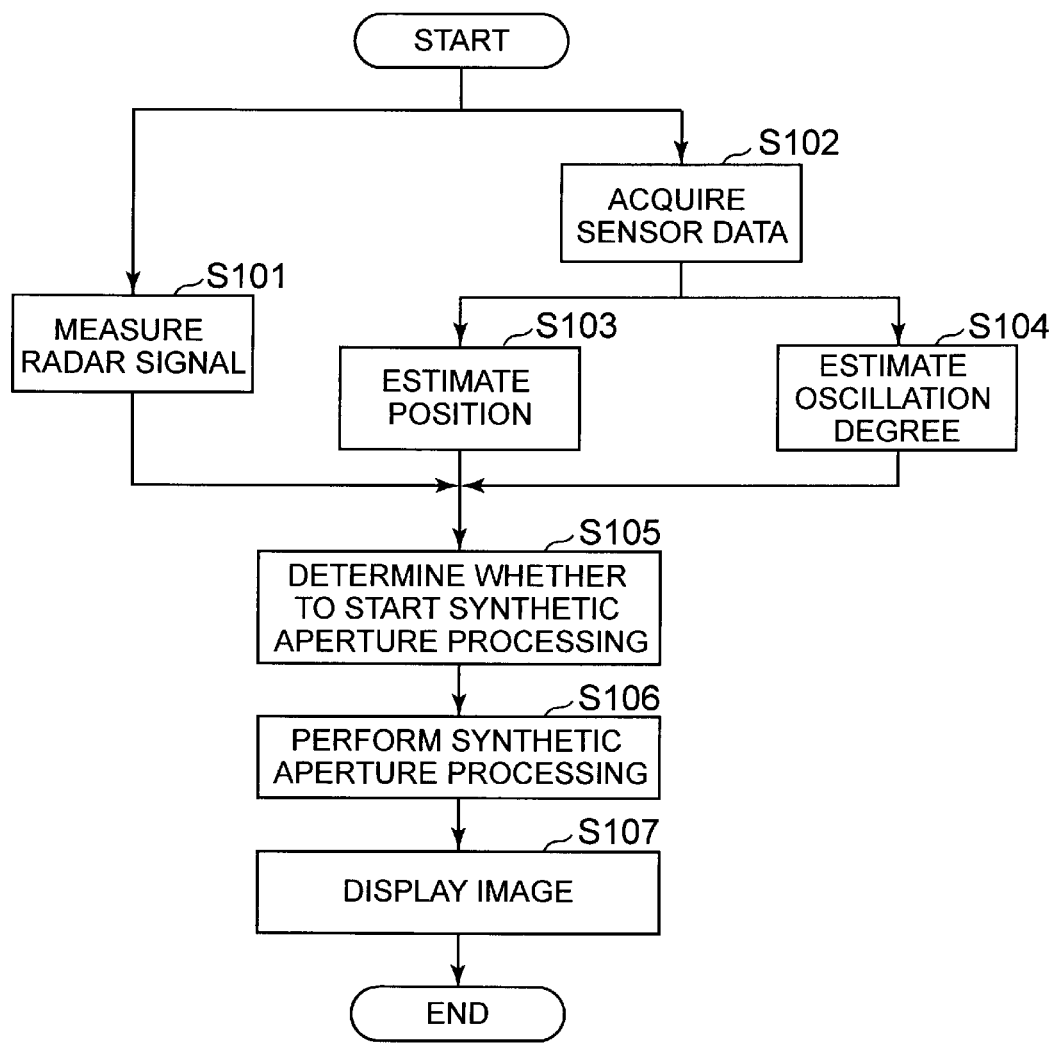
FIG. 12 is a flowchart showing the entire operation of the image display processing by a radar signal imaging device 100 of the first exemplary embodiment.

The operation of displaying an image of an object of the radar signal imaging device 100 of the present exemplary embodiment will be described below with reference to FIG. 12. FIG. 12 is a flowchart showing the entire operation of the image display processing by the radar signal imaging device 100 of the first exemplary embodiment.

The image display processing shown in FIG. 12 corresponds to the processing from the processing in which the reception antenna receives the reflected wave from an object after the transmission antenna transmits electromagnetic waves including the generated signal and the processing in which the external sensor 14 acquires sensor data to the processing in which an image is displayed on the display.

Note that the timing at which the image display processing shown in FIG. 12 is started is not particularly limited. For example, the image display processing may be started when the external sensor 14 detects the object, and the image display processing may be started again after the image is displayed on the display.

The radar signal transmission/reception unit 110 first transmits electromagnetic waves via Tx. The radar signal transmission/reception unit 110 then receives a reflected signal via Rx. The radar signal transmission/reception unit 110 processes the received signal into an IF signal (radar signal), and inputs the IF signal and the current time to the synthetic aperture processing unit 150 (step S101). Note that the IF signal generated by the radar signal transmission/ reception unit 110 is S(t, f, x, y) in the Expression (5).

Independently of the process in step S101, the data acquisition unit 120 acquires sensor data from the external sensor 14 (step S102). The data acquisition unit 120 then inputs the acquired sensor data and the current time to the position estimation unit 130 and the oscillation degree estimation unit 140.

The position estimation unit 130 then estimates position information TP(t) of the object on the basis of the inputted sensor data (step S103). The position estimation unit 130 then inputs the estimated position information TP(t), and the current time inputted from the data acquisition unit 120, to the synthetic aperture processing unit 150.

The oscillation degree estimation unit 140 estimates the oscillation degree VP(t) of the object on the basis of the inputted sensor data (step S104). The oscillation degree estimation unit 140 then inputs the estimated oscillation degree VP(t), and the current time inputted from the data acquisition unit 120, to the synthetic aperture processing unit 150.

The synthetic aperture processing unit 150 accumulates the current time and the radar signal S(t, f, x, y) inputted from the radar signal transmission/reception unit 110, the current time and the position information TP(t) of the object inputted from the position estimation unit 130, and the current time and the oscillation degree VP(t) of the object inputted from the oscillation degree estimation unit 140.

The synthetic aperture processing unit 150 then determines whether to start the synthetic aperture processing (step S105). After determining that the synthetic aperture processing is started, the synthetic aperture processing unit 150 selects a radar signal to be used for the synthetic aperture processing.

The synthetic aperture processing unit 150 then performs a synthetic aperture processing on the selected radar signal by DBF. Performing the synthetic aperture processing allows the synthetic aperture processing unit 150 to compute the image information A(v) (step S106). The synthetic aperture processing unit 150 then inputs the computed image information A(v) to the image display unit 160.

The image display unit 160 then displays the inputted image information A(v) on the display (step S107). After the display, the radar signal imaging device 100 ends the image display processing.

[Description of Effects]

The radar signal imaging device 100 of the present exemplary embodiment includes an oscillation degree estimation unit 140 for computing the oscillation degree of an object, and a synthetic aperture processing unit 150 for selecting a radar signal to be used in a synthetic aperture processing according to the computed oscillation degree.

The radar signal imaging device 100 of the present exemplary embodiment can obtain a clear image by suppressing image degradation in the synthetic aperture processing. The reason for obtaining a clear image is that the synthetic aperture processing unit 150 performs the synthetic aperture processing using only the radar signals obtained during a period in which the oscillation of the object is not recognized.

The radar signal imaging device 100 of the present exemplary embodiment also utilizes sensor data obtained by the external sensor 14 for position estimation of an object in the inverse synthetic aperture technique. Therefore, the radar signal imaging device 100 of the present exemplary embodiment can obtain a clear inverse synthetic aperture image since the device can estimate the position of an object more accurately.

Second Exemplary Embodiment

A second exemplary embodiment of a radar signal imaging system according to the present invention will now be described. In the present exemplary embodiment, the position of the object A obtained by the inverse synthetic aperture technique is estimated on the basis of the radar signal. The oscillation degree of the object A is also estimated on the basis of the sensor data acquired by the external sensor 14.

[Description of Configuration]

Figure 13:
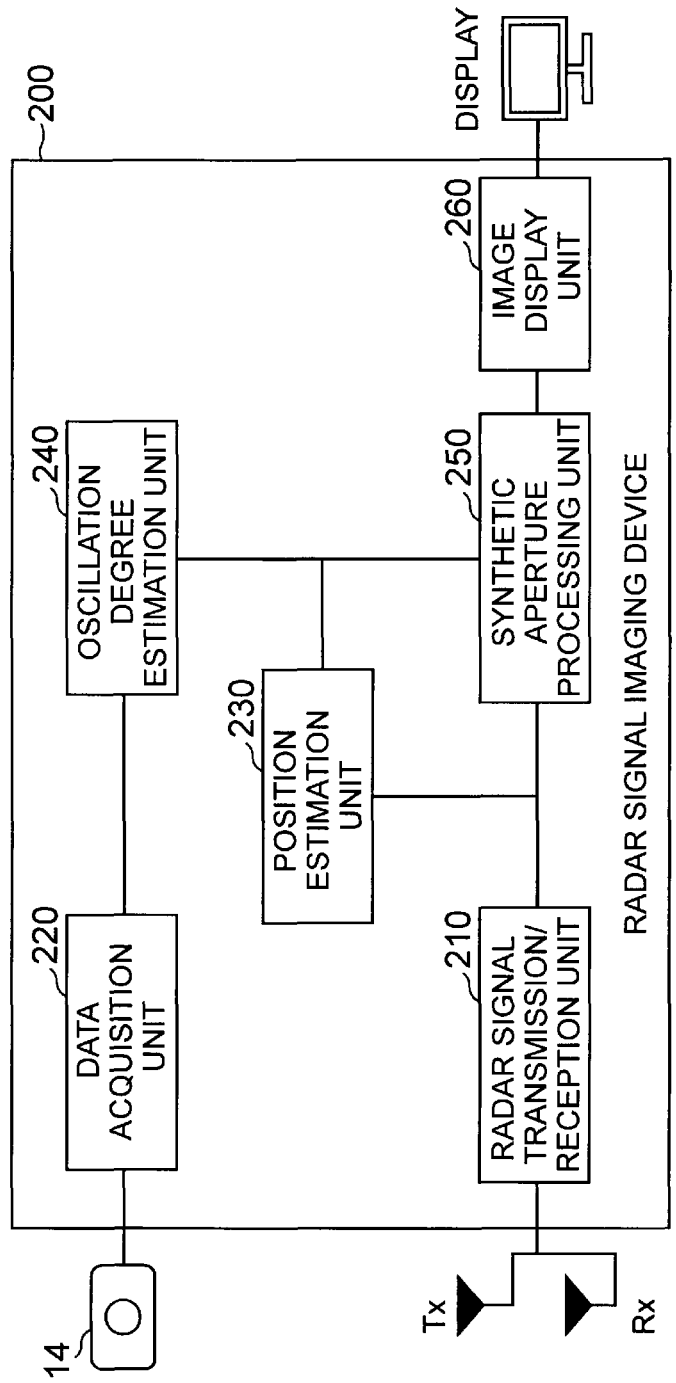
FIG. 13 is a block diagram showing a configuration example of a radar signal imaging device according to a second exemplary embodiment of the present invention.

FIG. 13 is a block diagram showing a configuration example of a radar signal imaging device according to the second exemplary embodiment of the present invention. A radar signal imaging device 200 shown in FIG. 13 is a device used in the radar signal imaging system 10 shown in FIG. 1.

The radar signal imaging device 200 shown in FIG. 13 includes a radar signal transmission/reception unit 210, a data acquisition unit 220, a position estimation unit 230, an oscillation degree estimation unit 240, a synthetic aperture processing unit 250, and an image display unit 260. Note that the time referred to by each component of the radar signal imaging device 200 is synchronized.

The radar signal transmission/reception unit 210 has a function of transmitting electromagnetic waves via a transmission antenna (Tx) and receiving reflected waves via a reception antenna (Rx). The radar signal transmission/reception unit 210 has a function of inputting the radar signal S(t, f, x, y) and the current time to the position estimation unit 230 in addition to the function of the radar signal transmission/reception unit 110 of the first exemplary embodiment.

The data acquisition unit 220 has a function of acquiring sensor data from the external sensor 14. The data acquisition unit 220 acquires sensor data from the external sensor 14, and inputs the current time and the acquired sensor data to the oscillation degree estimation unit 240.

The position estimation unit 230 has a function of estimating the position of the object A on the basis of the radar signal. The position estimation unit 230 receives the current time and the radar signal from the radar signal transmission/reception unit 210, and estimates position information TP(t) of the object A on the basis of the radar signal.

The position estimation unit 230 then inputs the estimated position information TP(t) of the object A and the current time inputted from the radar signal transmission/reception unit 210 to the synthetic aperture processing unit 250.

A position estimation method using DBF will be described below as an example of a method for estimating the position of an object on the basis of a radar signal. The position estimation unit 230 computes a spectrum intensity B(t, v) for each voxel on the basis of the radar signal S(t, f, x, y), as represented by the following Expression (7).

[Expression 7]

$$B(t, v) = \sum_{f=1}^{N_f} \sum_{y=1}^{N_y} \sum_{x=1}^{N_x} \left( S(t, f, x, y) \cdot e^{\frac{2\pi j \cdot F(f)}{c} R_v(t, x, y)} \right)$$

Expression (7)

In the above method, the position of a voxel having a strong intensity in the computed B(t, v) is regarded as the position of the object. In other words, the position information TP(t) of the object A in the present exemplary embodiment indicates the position of a voxel having a strong intensity.

The oscillation degree estimation unit 240 has a function of estimating the oscillation degree of the object A on the basis of the center data obtained by the external sensor 14. The oscillation degree estimation unit 240 has the same function as that of the oscillation degree estimation unit 140 of the first exemplary embodiment.

The synthetic aperture processing unit 250 has a function of performing a synthetic aperture processing on the basis of the estimated position of the object A and the estimated oscillation degree of the object A. The synthetic aperture processing unit 250 has the same function as that of the synthetic aperture processing unit 150 of the first exemplary embodiment.

The image display unit 260 has a function of displaying the image of the object A on the display on the basis of the data generated by the synthetic aperture processing. The image display unit 260 has the same function as that of the image display unit 160 of the first exemplary embodiment.

[Description of Operation]

Figure 14:
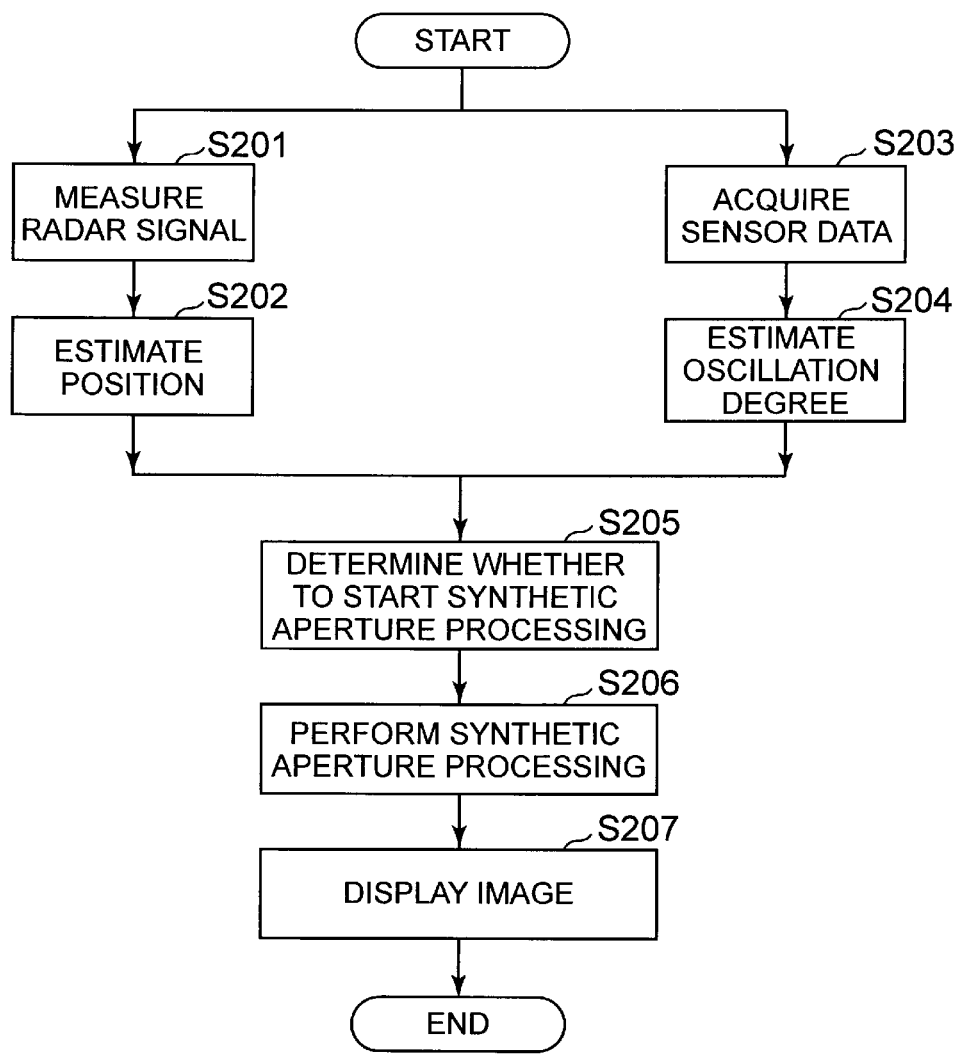
FIG. 14 is a flowchart showing the entire operation of the image display processing by a radar signal imaging device 200 of the second exemplary embodiment.

The operation of displaying an image of an object of the radar signal imaging device 200 of the present exemplary embodiment will be described below with reference to FIG. 14. FIG. 14 is a flowchart showing the entire operation of the image display processing by the radar signal imaging device 200 of the second exemplary embodiment.

The image display processing shown in FIG. 14 corresponds to the processing from the processing in which the reception antenna receives the reflected wave from an object after the transmission antenna transmits electromagnetic waves including the generated signal and the processing in which the external sensor 14 acquires sensor data to the processing in which the image is displayed on the display.

Note that the timing at which the image display processing shown in FIG. 14 is started is not particularly limited. For example, the image display processing may be started when the external sensor 14 detects the object, and the image display processing may be started again after the image is displayed on the display.

The radar signal transmission/reception unit 210 first transmits electromagnetic waves via Tx. The radar signal transmission/reception unit 210 then receives a reflected signal via Rx.

The radar signal transmission/reception unit 210 processes the received signal into an IF signal (radar signal), and inputs the IF signal and the current time to the position estimation unit 230 and the synthetic aperture processing unit 250 (step S201). Note that the IF signal generated by the radar signal transmission/reception unit 210 is S(t, f, x, y) in the Expression (5).

The position estimation unit 230 then estimates position information TP(t) of the object on the basis of the inputted radar signal (step S202). The position estimation unit 230 then inputs the estimated position information TP(t) and the current time inputted from the radar signal transmission/reception unit 210 to the synthetic aperture processing unit 250.

Independently of the processes in steps S201 to S202, the data acquisition unit 220 acquires sensor data from the external sensor 14 (step S203). The data acquisition unit 220 then inputs the acquired sensor data and the current time to the oscillation degree estimation unit 240.

The oscillation degree estimation unit 240 then estimates the oscillation degree VP(t) of the object on the basis of the inputted sensor data (step S204). The oscillation degree estimation unit 240 then inputs the estimated oscillation degree VP(t) and the current time inputted from the data acquisition unit 220 to the synthetic aperture processing unit 250.

The processes in steps S205 to S207 are the same as those in steps S105 to S107 shown in FIG. 12.

[Description of Effects]

The position estimation unit 230 of the radar signal imaging device 200 of the present exemplary embodiment utilizes a radar signal to estimate the position of an object in the inverse synthetic aperture technique. In other words, when the inverse synthetic aperture image is acquired, the radar signal imaging device 200 can independently perform the position estimation and the oscillation degree estimation of the object, so that the radar signal imaging device 200 can acquire the image information faster than the radar signal imaging device 100 of the first exemplary embodiment.

Third Exemplary Embodiment

A third exemplary embodiment of a radar signal imaging system according to the present invention will now be described. In the present exemplary embodiment, the position and the oscillation degree of the object A obtained by the inverse synthetic aperture technique are estimated on the basis of the radar signal.

[Description of Configuration]

Figure 15:
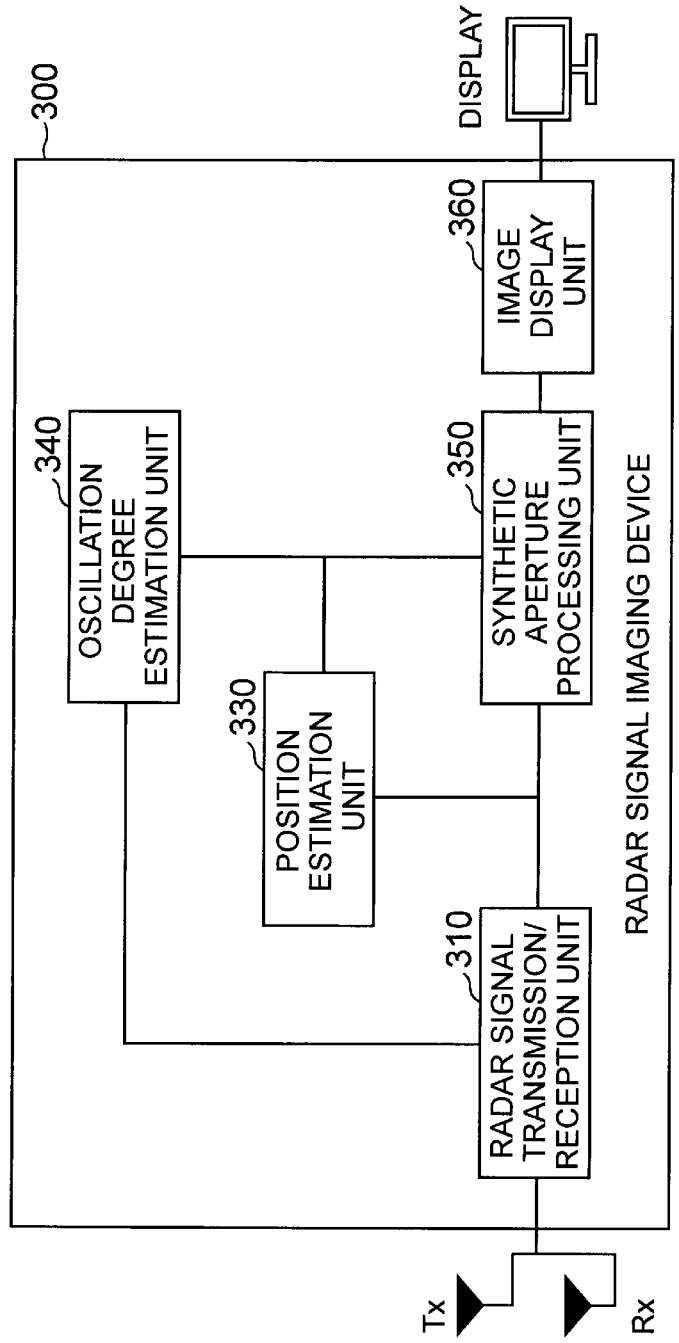
FIG. 15 is a block diagram showing a configuration example of a radar signal imaging device according to a third exemplary embodiment of the present invention.

FIG. 15 is a block diagram showing a configuration example of a radar signal imaging device according to the third exemplary embodiment of the present invention. The radar signal imaging device 300 shown in FIG. 15 is a device used in the radar signal imaging system 10 shown in FIG. 1.

The radar signal imaging device 300 shown in FIG. 15 includes a radar signal transmission/reception unit 310, a position estimation unit 330, an oscillation degree estimation unit 340, a synthetic aperture processing unit 350, and an image display unit 360. Note that the time referred to by each component of the radar signal imaging device 300 is synchronized.

The radar signal transmission/reception unit 310 has a function of transmitting electromagnetic waves via a transmission antenna (Tx) and receiving reflected waves via a reception antenna (Rx). The radar signal transmission/reception unit 310 has a function of inputting the radar signal S(t, f, x, y) and the current time to the oscillation degree estimation unit 340 in addition to the function of the radar signal transmission/reception unit 210 of the second exemplary embodiment.

The position estimation unit 330 has a function of estimating the position of the object A on the basis of the radar signal. The position estimation unit 330 has the same function as that of the position estimation unit 230 of the second exemplary embodiment.

The oscillation degree estimation unit 340 has a function of estimating the oscillation degree of the object A on the basis of the radar signal. The oscillation degree estimation unit 340 estimates the oscillation degree of the object A on the basis of the radar signal inputted from the radar signal transmission/reception unit 310.

The oscillation degree estimation unit 340 inputs the oscillation degree with time indicating the estimated oscillation degree to the synthetic aperture processing unit 350. The time attached to the oscillation degree inputted is the same as the current time inputted from the radar signal transmission/reception unit 310. Alternatively, the information associated with the current time inputted from the radar signal transmission/reception unit 310 may be attached to the oscillation degree instead of the time.

NPL 4 describes a method for estimating the oscillation degree of an object on the basis of, for example, a radar signal. The method described in NPL 4 computes a change in Doppler frequency with the lapse of time on the basis of radar signals arranged in time series.

The oscillation degree estimation unit 340 of the present exemplary embodiment handles the Doppler frequencies arranged in time series as the oscillation degree VP(t) of the object A. In other words, the oscillation degree estimation unit 340 uses the Doppler frequencies arranged in time series as a selection criterion of the radar signal used in the synthetic aperture processing. Note that the method for selecting the radar signal by the synthetic aperture processing unit 350 of the present exemplary embodiment is the same as that of the first exemplary embodiment.

The synthetic aperture processing unit 350 has a function of performing a synthetic aperture processing on the basis of the estimated position of the object A and the estimated oscillation degree of the object A. The synthetic aperture processing unit 350 has the same function as that of the synthetic aperture processing unit 250 of the second exemplary embodiment.

The image display unit 360 has a function of displaying the image of the object A on the display on the basis of the data generated by the synthetic aperture processing. The image display unit 360 has the same function as that of the image display unit 260 of the second exemplary embodiment.

[Description of Operation]

Figure 16:
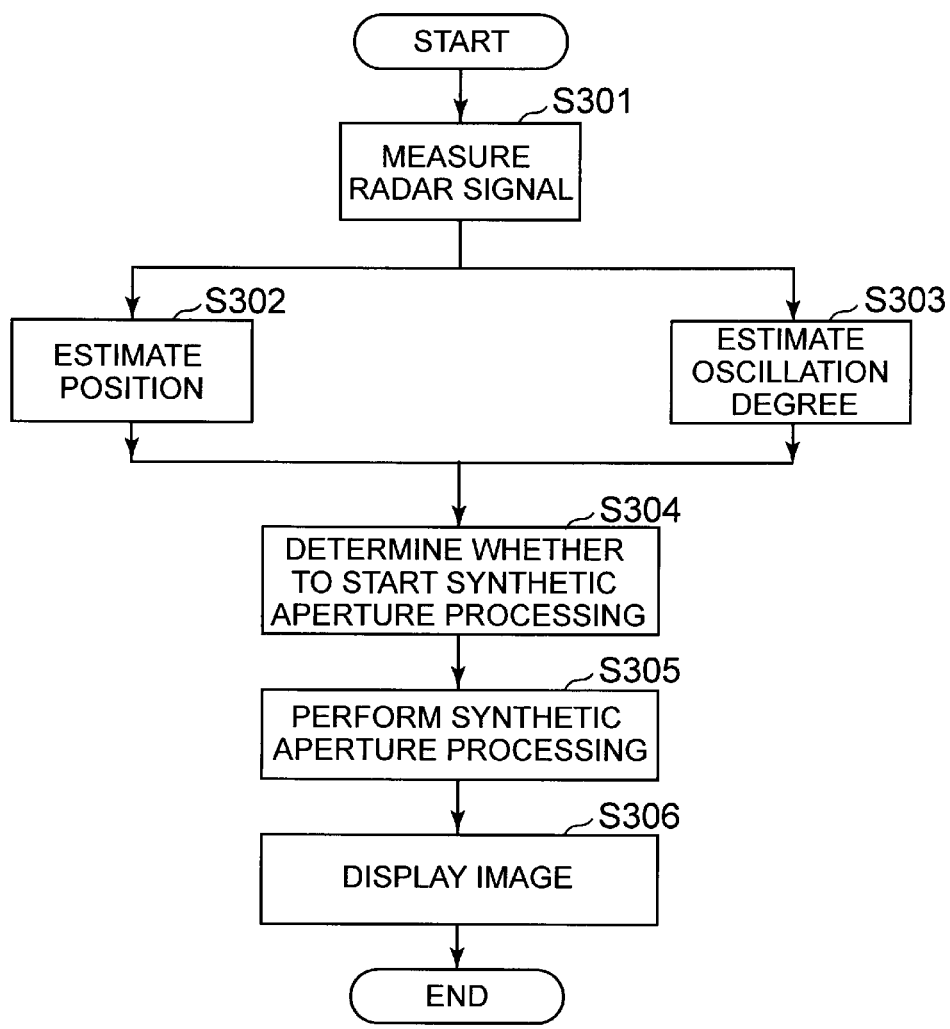
FIG. 16 is a flowchart showing the entire operation of the image display processing by a radar signal imaging device 300 of the third exemplary embodiment.

The operation of displaying an image of an object of the radar signal imaging device 300 of the present exemplary embodiment will be described below with reference to FIG. 16. FIG. 16 is a flowchart showing the entire operation of the image display processing by the radar signal imaging device 300 of the third exemplary embodiment.

The image display processing shown in FIG. 16 corresponds to the processing from the processing in which the reception antenna receives the reflected wave from an object after the transmission antenna transmits electromagnetic waves including the generated signal and the processing in which the external sensor 14 acquires sensor data to the processing in which the image is displayed on the display.

Note that the timing at which the image display processing shown in FIG. 16 is started is not particularly limited. For example, the image display processing may be started when the external sensor 14 detects the object, and the image display processing may be started again after the image is displayed on the display.

The radar signal transmission/reception unit 310 first transmits electromagnetic waves via Tx. The radar signal transmission/reception unit 310 then receives a reflected signal via Rx. The radar signal transmission/reception unit 310 processes the received signal into an IF signal (radar signal), and inputs the IF signal and the current time to the position estimation unit 330, the oscillation degree estimation unit 340, and the synthetic aperture processing unit 350 (step S301). Note that the IF signal generated by the radar signal transmission/reception unit 310 is S(t, f, x, y) in the Expression (5).

The position estimation unit 330 then estimates position information TP(t) of the object on the basis of the inputted radar signal (step S302). The position estimation unit 330 then inputs the estimated position information TP(t) and the current time inputted from the radar signal transmission/reception unit 310 to the synthetic aperture processing unit 350.

Independently of the process in step S302, the oscillation degree estimation unit 340 estimates the oscillation degree VP(t) of the object on the basis of the inputted radar signal (step S303). The oscillation degree estimation unit 340 estimates VP(t) by a method described in, for example, NPL 4. The oscillation degree estimation unit 340 then inputs the estimated oscillation degree VP(t) and the current time inputted from the radar signal transmission/reception unit 310 to the synthetic aperture processing unit 350.

The processes in steps S304 to S306 are the same as those in steps S105 to S107 shown in FIG. 12.

[Description of Effects]

The oscillation degree estimation unit 340 of the radar signal imaging device 300 of the present exemplary embodiment utilizes the radar signal to estimate the oscillation degree of an object in the inverse synthetic aperture technique. In other words, even in a situation where the external sensor 14 is not provided, the radar signal imaging device 300 can acquire an inverse synthetic aperture image.

Figure 17:
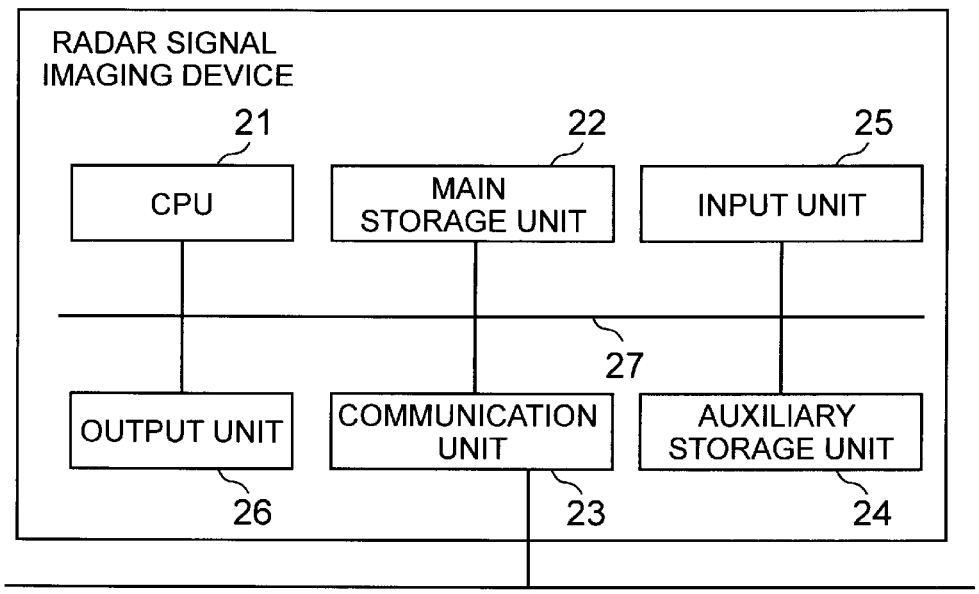
FIG. 17 is an explanatory diagram showing a hardware configuration example of a radar signal imaging device according to the present invention.

A specific example of a hardware configuration of the radar signal imaging device of each exemplary embodiment will be described below. FIG. 17 is an explanatory diagram showing a hardware configuration example of a radar signal imaging device according to the present invention.

The radar signal imaging device shown in FIG. 17 includes a CPU (Central Processing Unit) 21, a main storage unit 22, a communication unit 23, and an auxiliary storage unit 24. The radar signal imaging device may also include an input unit 25 for the user to operate and an output unit 26 for presenting the processing result or the progress of the processing contents to the user.

Note that the radar signal imaging device shown in FIG. 17 may include a DSP (Digital Signal Processor) instead of the CPU 21. Alternatively, the radar signal imaging device shown in FIG. 17 may include the CPU 21 and the DSP.

The main storage unit 22 is used as a work area for data or a temporary save area for data. The main storage unit 22 is, for example, a RAM (Random Access Memory).

The communication unit 23 has a function of inputting and outputting data to and from peripheral devices via a wired network or a wireless network (information communication network).

The auxiliary storage unit 24 is a tangible storage medium that is not temporary. Examples of tangible non-temporary storage media include magnetic disks, magneto-optical disks, CD-ROMs (Compact Disk Read Only Memory), DVD-ROMs (Digital Versatile Disk Read Only Memory), and semiconductor memories.

The input unit 25 has a function of inputting data and processing instructions. The input unit 25 is an input device such as a keyboard or a mouse.

The output unit 26 has a function of outputting data. The output unit 26 is, for example, a display device such as a liquid crystal display device or a printing device such as a printer.

As shown in FIG. 17, in the radar signal imaging device, each of the components is connected to a system bus 27.

The auxiliary storage unit 24 stores, for example, programs for implementing the radar signal transmission/reception unit 110, the radar signal transmission/reception unit 210, the radar signal transmission/reception unit 310, the data acquisition unit 120, the data acquisition unit 220, the position estimation unit 130, the position estimation unit 230, the position estimation unit 330, the oscillation degree estimation unit 140, the oscillation degree estimation unit 240, the oscillation degree estimation unit 340, the synthetic aperture processing unit 150, the synthetic aperture processing unit 250, the synthetic aperture processing unit 350, the image display unit 160, the image display unit 260, and the image display unit 360.

The main storage unit 22 is also used as a storage area for the synthetic aperture processing unit 150, the synthetic aperture processing unit 250, and the synthetic aperture processing unit 350, for example. The data acquisition unit 120, the data acquisition unit 220, the image display unit 160, the image display unit 260, and the image display unit 360 may also execute communication processing via the communication unit 23.

Note that each of the radar signal imaging devices may be implemented by hardware. For example, the radar signal imaging device 100 may be provided with a circuit including hardware components such as an LSI (Large Scale Integration) in which a program for implementing a function as shown in FIG. 2 is incorporated.

Further, each of the radar signal imaging devices may be implemented by software by the CPU 21 shown in FIG. 17 executing a program for providing functions of the components.

When implemented by software, each function is implemented by software by the CPU 21 loading and executing a program stored in the auxiliary storage unit 24 into the main storage unit 22 and controlling the operation of the radar signal imaging device.

Some or all of the components may be implemented by a general purpose circuit (circuitry), a dedicated circuit, a processor, or any combination thereof. These components may be composed of a single chip or a plurality of chips connected via a bus. Some or all of the components may be implemented by a combination of, for example, the above-described circuit and program.

When some or all of the components are implemented by, for example, a plurality of information processing devices or circuits, the plurality of information processing devices or circuits may be centralized or distributed. For example, the information processing device or circuit may be implemented as a client and server system or a cloud computing system, each component of which is connected via a communication network.

Figure 18:
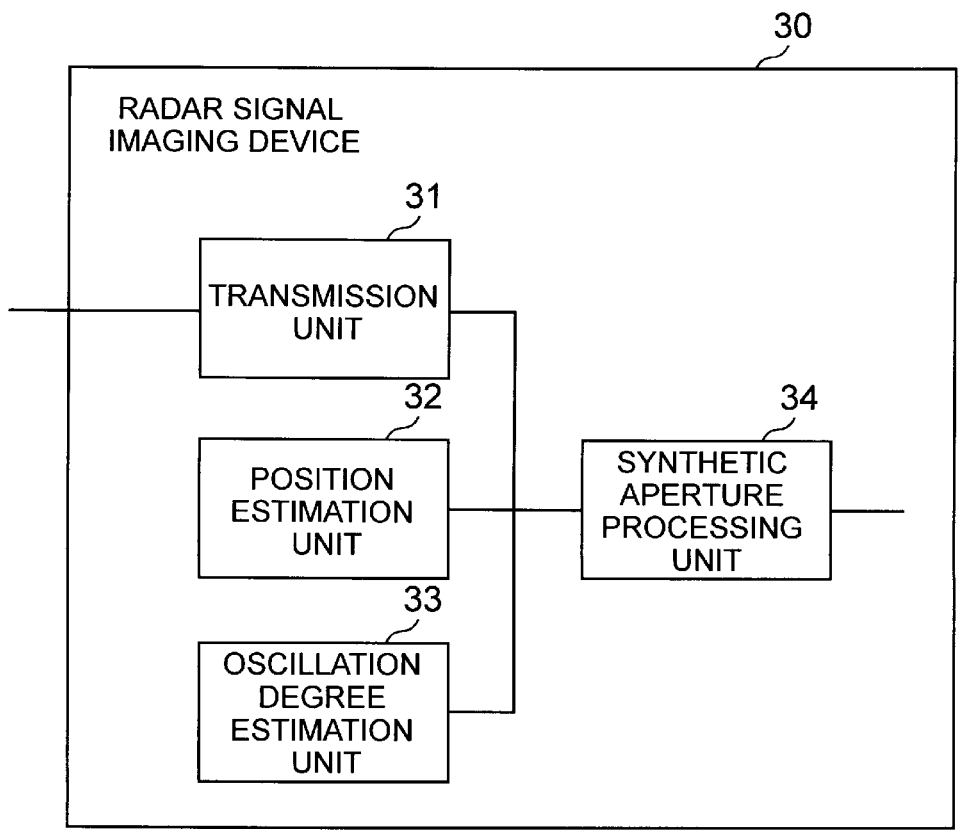
FIG. 18 is a block diagram showing the outline of a radar signal imaging device according to the present invention.
Figure 19:
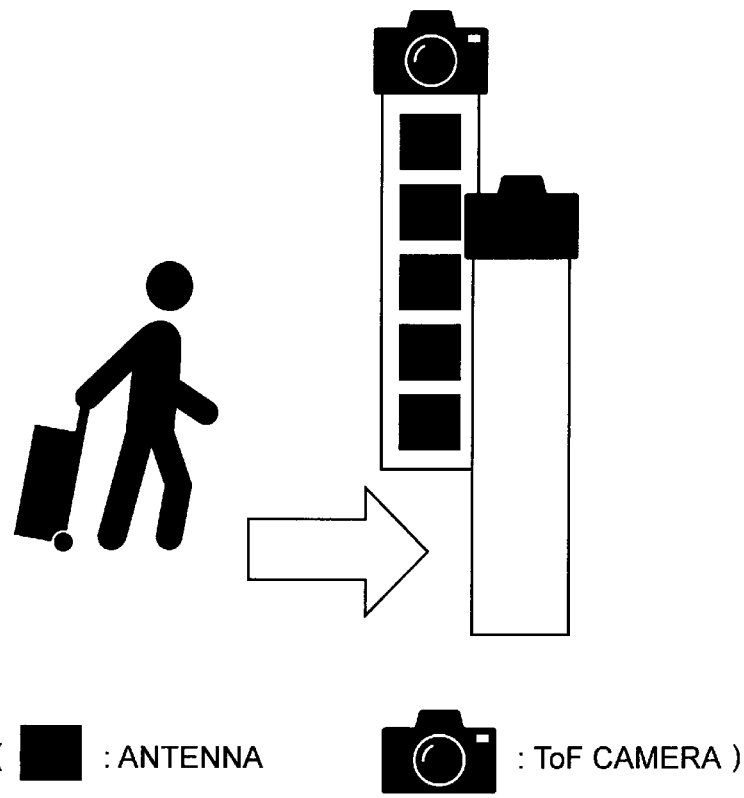
FIG. 19 is an explanatory diagram showing an example of a system using the inverse synthetic aperture technique.
Figure 20:
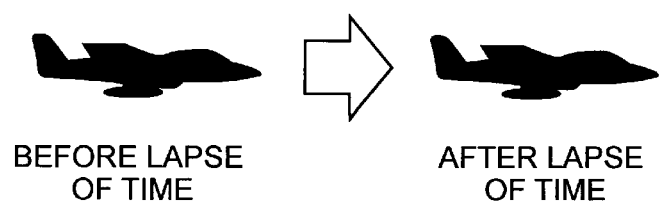
FIG. 20 is an explanatory diagram showing an example of a change of a rigid body with the lapse of time.
Figure 21:
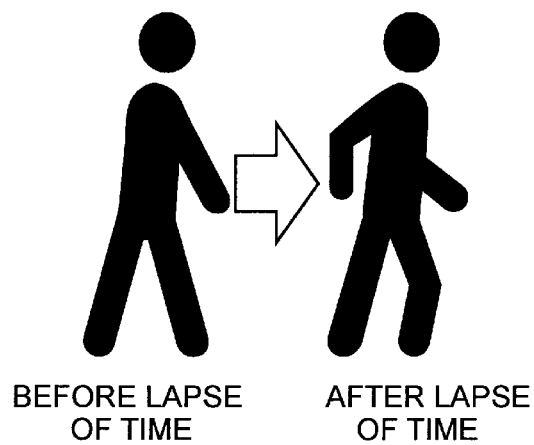
FIG. 21 is an explanatory diagram showing an example of a change of a person with the lapse of time.

The outline of the present invention will now be described. FIG. 18 is a block diagram showing the outline of a radar signal imaging device according to the present invention. A radar signal imaging device 30 according to the present invention includes: a transmission unit 31 (for example, the radar signal transmission/reception unit 110) which transmits a radar signal toward an object to be imaged that is a non-rigid body; a position estimation unit 32 (for example, the position estimation unit 130) which estimates the position of the object; an oscillation degree estimation unit 33 (for example, the oscillation degree estimation unit 140) which estimates an oscillation degree which is a degree of change within a predetermined period in the relative positions of feature points constituting the object; and a synthetic aperture processing unit 34 (for example, the synthetic aperture processing unit 150) which performs synthetic aperture processing on the radar signal reflected by the object on the basis of the estimated position of the object and the estimated oscillation degree.

Such a configuration allows the radar signal imaging device to image the non-rigid object clearly by the inverse synthetic aperture technique.

The synthetic aperture processing unit 34 may also perform the synthetic aperture processing on the radar signal corresponding to a period in which the estimated oscillation degree is smaller than a first predetermined value among the radar signals reflected from the object.

The synthetic aperture processing unit 34 may also perform the synthetic aperture processing on the radar signal corresponding to a period in which the estimated variation of the oscillation degree is smaller than a second predetermined value among the radar signals reflected from the object.

Such a configuration allows the radar signal imaging device to image the non-rigid object more clearly.

The oscillation degree estimation unit 33 may also estimate the oscillation degree on the basis of the radar signal reflected from the object. The oscillation degree estimation unit 33 may also estimate the Doppler frequencies arranged in time series as the oscillation degree.

Such a configuration allows the radar signal imaging device to estimate the oscillation degree on the basis of only the reflected wave from the object.

The radar signal imaging device 30 may also include an acquisition unit which acquires sensor data which is data obtained by an external sensor measuring a predetermined physical quantity of the object, and the oscillation degree estimation unit 33 may estimate the oscillation degree on the basis of the acquired sensor data.

Such a configuration allows the radar signal imaging device to estimate the oscillation degree of the object more accurately.

The sensor data is image data, and the oscillation degree estimation unit 33 may estimate the oscillation degree by image-processing the acquired image data.

Such a configuration allows the radar signal imaging device to estimate the oscillation degree of the object on the basis of the position coordinates of the feature points and the number of pixels of the image data.

The position estimation unit 32 may estimate the position of the object on the basis of the radar signal reflected from the object.

Such a configuration allows the radar signal imaging device to estimate the position of the object on the basis of only the reflected wave from the object.

The position estimation unit 32 may estimate the position of the object on the basis of the acquired sensor data.

Such a configuration allows the radar signal imaging device to estimate the position of the object more accurately.

The radar signal imaging device 30 may also include a display unit (for example, the image display unit 160) which displays the image information generated by the synthetic aperture processing in a predetermined format on a display means (for example, the display).

Such a configuration allows the radar signal imaging device to display a three-dimensional image of the object.

Although the present invention has been described with reference to the exemplary embodiments and examples, the present invention is not limited to the exemplary embodiments and examples. The configurations and details of the present invention may be modified in various ways as will be understood by those skilled in the art within the scope of the present invention.

REFERENCE SIGNS LIST

10 Radar signal imaging system
11, 12 Side panel
13 Area
14 External sensor
21 CPU
22 Main storage unit
23 Communication unit
24 Auxiliary storage unit
25 Input unit
26 Output unit
27 System bus
30,100,200, 300 Radar signal imaging device
31 Transmission unit
32, 130, 230, 330 Position estimation unit
33, 140, 240, 3400 scillation degree estimation unit
34, 150, 250, 350 Synthetic aperture processing unit
110, 210, 310 Radar signal transmission/reception unit
120, 220 Data acquisition unit
160, 260, 360 Image display unit
What is claimed is:
1. A radar signal imaging device comprising:
one or more memories storing instructions; and
one or more processors configured to execute the instructions to:

transmit a radar signal toward an object to be imaged that is a non-rigid body;
estimate a position of the object;
estimate an oscillation degree, which is a degree of change within a predetermined period, in relative positions of feature points constituting the object; and
perform synthetic aperture processing on the radar signal reflected by the object on the basis of the estimated position of the object and the estimated oscillation degree.

2. The radar signal imaging device according to claim 1, wherein
the one or more processors is further configured to execute the instructions to:
perform the synthetic aperture processing on the radar signal corresponding to a period in which the estimated oscillation degree is smaller than a first predetermined value among the radar signals reflected from the object.

3. The radar signal imaging device according to claim 1, wherein
the one or more processors is further configured to execute the instructions to:
perform the synthetic aperture processing on the radar signal corresponding to a period in which the estimated variation of the oscillation degree is smaller than a second predetermined value among the radar signals reflected from the object.

4. The radar signal imaging device according to claim 1, wherein
the one or more processors is further configured to execute the instructions to:
estimate the oscillation degree on the basis of the radar signal reflected from the object.

5. The radar signal imaging device according to claim 1, wherein
the one or more processors is further configured to execute the instructions to:
acquire sensor data which is data obtained by an external sensor measuring a predetermined physical quantity of the object, and
estimate the oscillation degree on the basis of the acquired sensor data.

6. The radar signal imaging device according to claim 5, wherein
the sensor data is image data, and
the one or more processors is further configured to execute the instructions to:
estimate the oscillation degree by image-processing the acquired image data.

7. The radar signal imaging device according to claim 1, wherein
the one or more processors is further configured to execute the instructions to:
estimate the position of the object on the basis of the radar signal reflected from the object.

8. The radar signal imaging device according to claim 5, wherein
the one or more processors is further configured to execute the instructions to:
estimate the position of the object on the basis of the acquired sensor data.

9. A radar signal imaging method comprising:
transmitting a radar signal toward an object to be imaged that is a non-rigid body;
estimating a position of the object;
estimating an oscillation degree, which is a degree of change within a predetermined period, in relative positions of feature points constituting the object; and
performing synthetic aperture processing on the radar signal reflected by the object on the basis of the estimated position of the object and the estimated oscillation degree.

10. A non-transitory computer-readable capturing medium having captured therein a radar signal imaging program for causing a computer to execute:
a transmission process of transmitting a radar signal toward an object to be imaged that is a non-rigid body;
a position estimation process of estimating a position of the object;
an oscillation degree estimation process of estimating an oscillation degree, which is a degree of change within a predetermined period, in relative positions of feature points constituting the object; and
a synthetic aperture process on the radar signal reflected by the object on the basis of the estimated position of the object and the estimated oscillation degree.

11. The radar signal imaging device according to claim 2, wherein
the one or more processors is further configured to execute the instructions to:
perform the synthetic aperture processing on the radar signal corresponding to the period in which the estimated variation of the oscillation degree is smaller than a second predetermined value among the radar signals reflected from the object.

12. The radar signal imaging device according to claim 2, wherein
the one or more processors is further configured to execute the instructions to:
estimate the oscillation degree on the basis of the radar signal reflected from the object.

13. The radar signal imaging device according to claim 3, wherein
the one or more processors is further configured to execute the instructions to:
estimate the oscillation degree on the basis of the radar signal reflected from the object.

14. The radar signal imaging device according to claim 11, wherein
the one or more processors is further configured to execute the instructions to:
estimate the oscillation degree on the basis of the radar signal reflected from the object.

15. The radar signal imaging device according to claim 2, wherein
the one or more processors is further configured to execute the instructions to:
acquire sensor data which is data obtained by an external sensor measuring a predetermined physical quantity of the object, and
estimate the oscillation degree on the basis of the acquired sensor data.

16. The radar signal imaging device according to claim 3, wherein
the one or more processors is further configured to execute the instructions to:
acquire sensor data which is data obtained by an external sensor measuring a predetermined physical quantity of the object, and
estimate the oscillation degree on the basis of the acquired sensor data.

17. The radar signal imaging device according to claim 11, wherein
the one or more processors is further configured to execute the instructions to:
acquire sensor data which is data obtained by an external sensor measuring a predetermined physical quantity of the object, and
estimate the oscillation degree on the basis of the acquired sensor data.

18. The radar signal imaging device according to claim 15, wherein
the sensor data is image data, and
the one or more processors is further configured to execute the instructions to estimate the oscillation degree by image-processing the acquired image data.

19. The radar signal imaging device according to claim 1, wherein
the one or more processors is further configured to execute the instructions to estimate Doppler frequencies arranged in time series as the oscillation degree.

20. The radar signal imaging device according to claim 1, comprising a display which displays image information generated by the synthetic aperture processing in a predetermined format on a display means.

* * * * *